Patented May 18, 1937

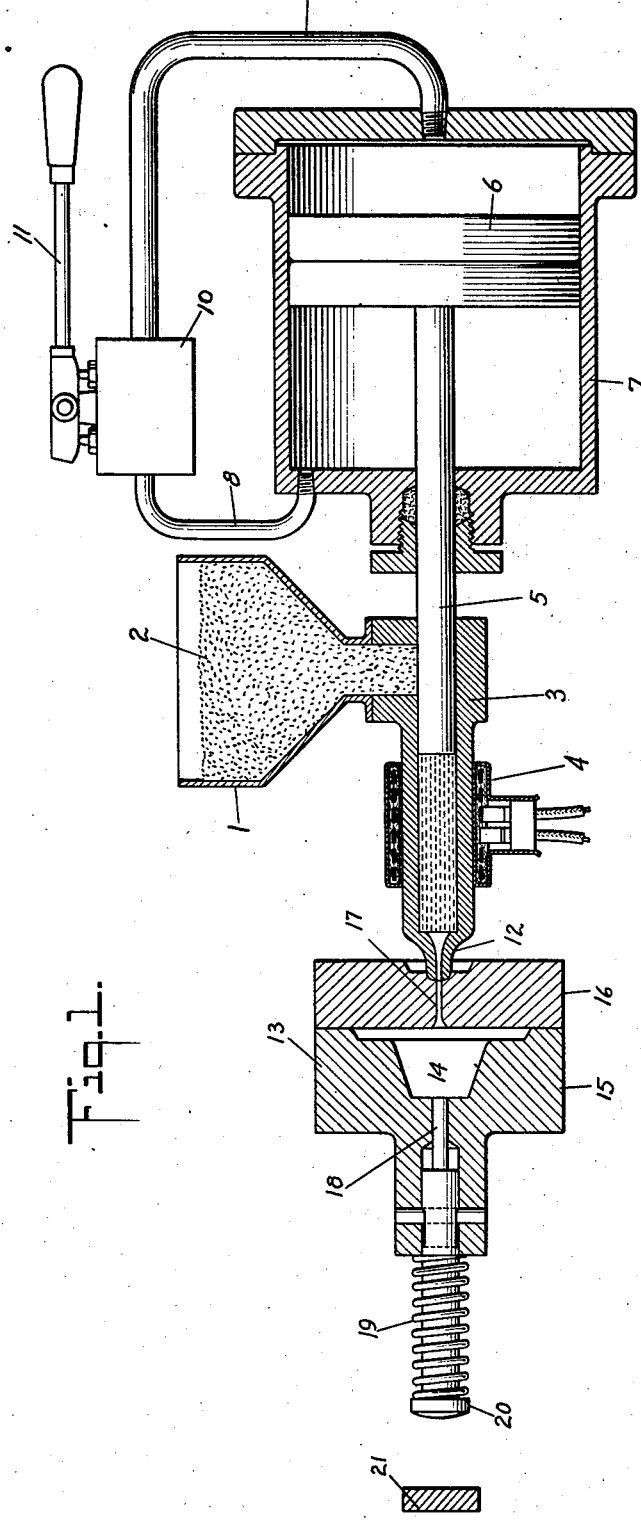

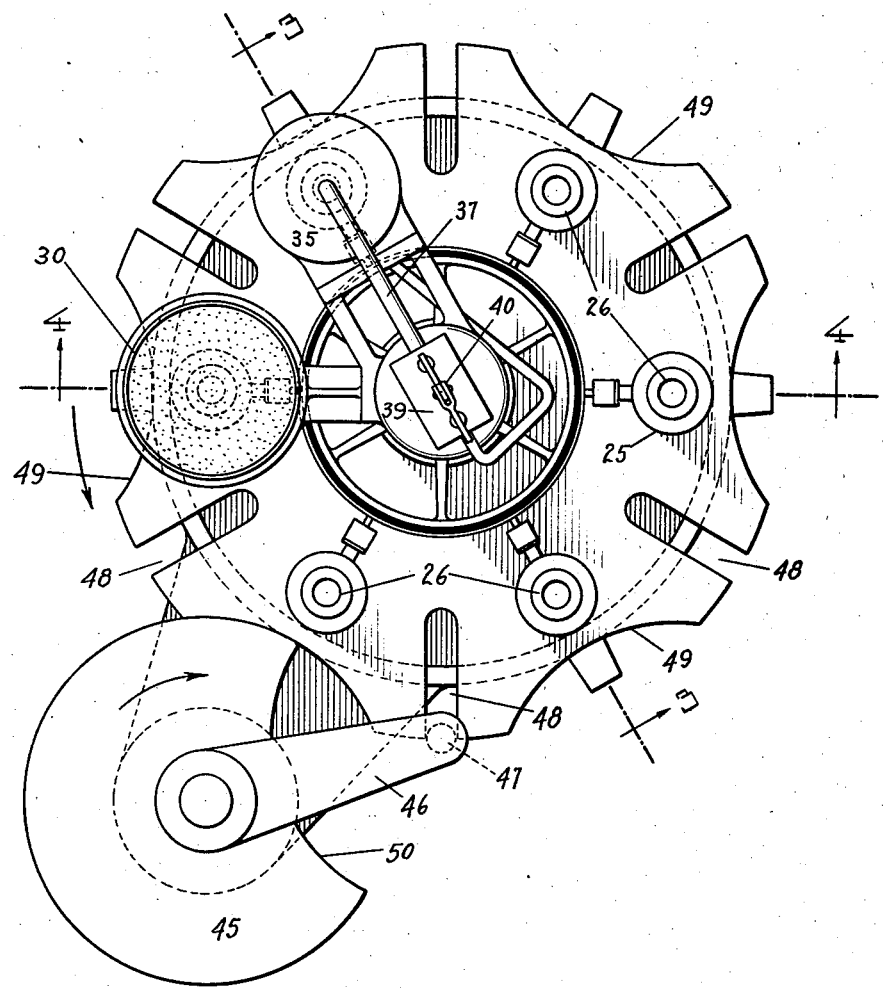

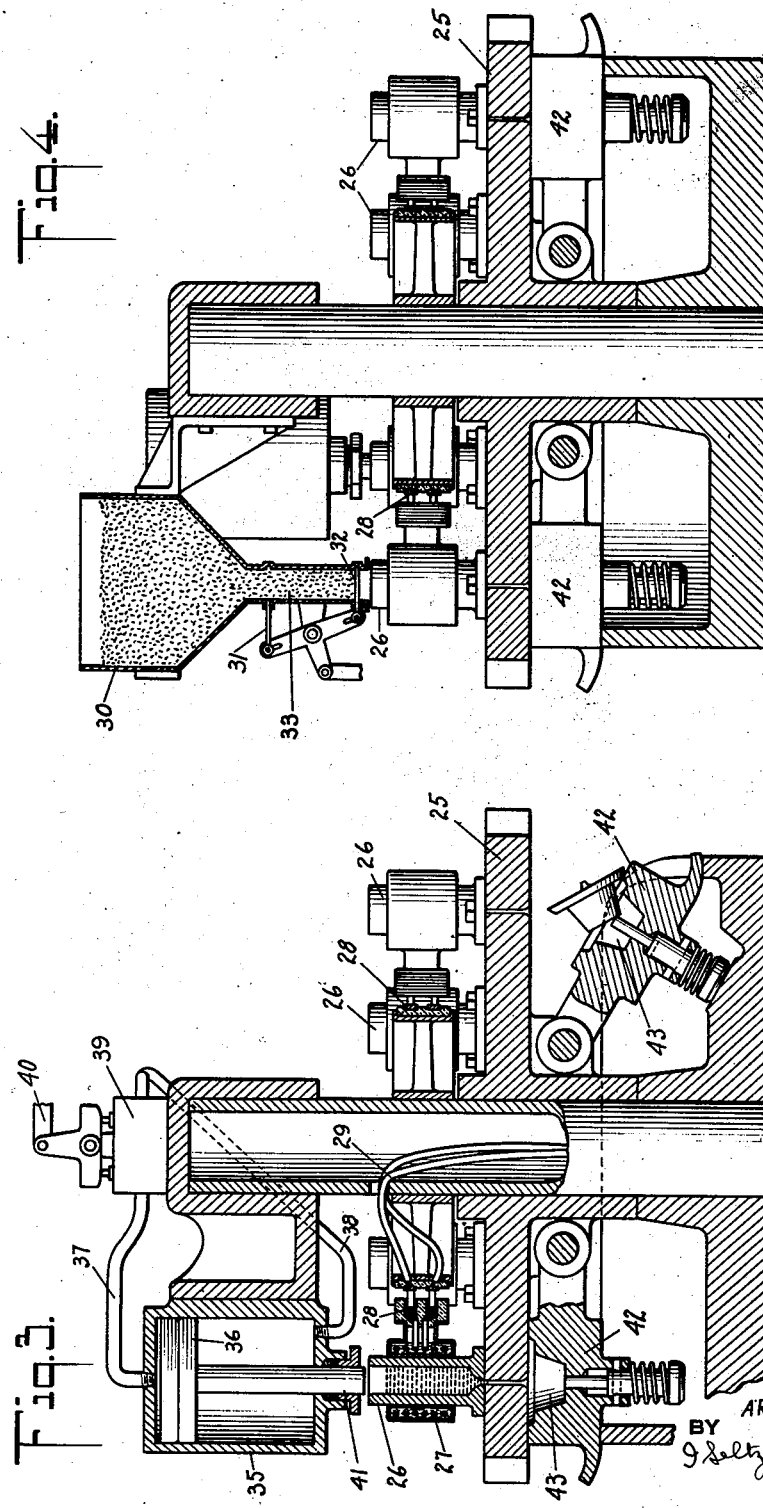

2,080,783

UNITED STATES PATENT OFFICE 2,080,783

METHOD OF MOLDING THERMOPLASTIC MATERIALS

Arthur E. Petersen, Westfield, N. J., assignor to Celluloid Corporation, a corporation of New Jersey Application March 9, 1932, Serial No. 597,689

1 Claim. (Cl. 18—55)

This invention relates to the molding of thermoplastic compositions and relates more particularly to the extrusion of such compositions while they are in a plastic or liquid state into molds or dies of desired shape.

An object of my invention is to provide method and means for the extrusion molding of thermoplastic materials, particularly material comprising organic derivatives of cellulose, whereby greatly improved molded products are produced. A further object of my invention is to extrude such compositions while they are at suitable temperatures and/or at suitable pressures, so that strong molded articles made of compositions that are substantially free of decomposition may be obtained. Other objects of this invention will appear from the following detailed description.

It has been proposed to mold compositions containing derivatives of cellulose by heating the same and forcing the heated compositions into a mold cavity. In the prior practice, the molding composition was fed to a heating chamber of substantial volume and there heat was applied in an attempt to impart plasticity to the composition. The volume of the mold cavity was considerably smaller than that of the heating chamber, and therefore upon the application of pressure, only a part of the material in the heating chamber was charged into the mold cavity, while the remaining portion was left to be further heated. In this manner, some of the molding composition remained in the heating chamber during many cycles of the extrusion process, and therefore was subjected to the action of heat for a long period of time, during which it became decomposed.

Furthermore, because of the large volume of the heating chamber employed in the prior practice, and the removal of only part of the molding composition at a time, there was no uniform heating of the entire mass, with the result that the molding composition at the periphery of the heating chamber near the heating unit and in the vicinity of the extrusion nozzle became overheated, while the center portion and that part near the piston or plunger employed for forcing the material into the mold would be poorly heated, with the result that the molded product would be non-homogeneous in physical characteristics.

As a result of the drawbacks of the prior methods of extrusion, articles formed therefrom lack uniformity of quality as regards strength, thermoplasticity, configuration of color designs, etc.

I have found that the objection of the prior process may be overcome by charging an amount of the molding composition into the heating chamber that is at most relatively slightly in excess of that required to fill the mold cavity, and heating the molding composition for such time as to impart the required plasticity to the whole mass of the same while avoiding decomposition by overheating. I have further found that greatly improved molded products can be produced, even while employing the prior processes, by extruding the molding composition into the mold cavity under very high pressures.

In accordance with my invention, I prepare molded articles from thermoplastic compositions, particularly those containing organic derivatives of cellulose, by an extrusion molding process, wherein at least one, but preferably all of the following expedients are observed, namely (1) the amount of thermoplastic material that is heated prior to extrusion is not greatly in excess of that required to fill the mold cavity, (2) the thermoplastic material is heated so that it is in such a state of plasticity or liquidity that upon the application of pressure the whole mass flows readily, (3) the pressure employed for forcing the molding material from the heating chamber into the mold cavity is very high.

While any suitable thermoplastic composition containing organic compounds may be employed in my invention, this invention is particularly applicable to the molding of thermoplastic compositions containing organic derivatives of cellulose such as organic esters of cellulose and cellulose ethers. Examples of such organic esters of cellulose are cellulose acetate, cellulose formate, cellulose propionate and cellulose butyrate, while examples of cellulose ethers are ethyl cellulose, methyl cellulose and benzyl cellulose.

In addition to the organic derivative of cellulose, the molding composition will preferably contain plasticizers or softening agents such as dimethyl phthalate, diethyl phthalate, di (methoxy ethyl) phthalate, diethyl tartrate, dibutyl tartrate, triacetin, triphenyl phosphate, etc. or mixtures of two or more of these. The plasticizer and organic derivative of cellulose should preferably be in very intimate admixture, and may be prepared by any suitable methods, for instance such as described in the U. S. patents to Herrmann, No. 1,510,779; C. Dreyfus, No. 1,595,506; C. Dreyfus and G. Schneider, No. 1,732,330 and the application of C. Dreyfus and G. Schneider, No. 567,294, filed October 6, 1931. The molding composition may also contain pigments, dyes or other effect materials. The molding composition may be in the form of powder, chips, flakes or any other suitable physical form to attain the desired results.

In order to obtain the best results, the molding composition should preferably be heated, prior to extrusion into the die or mold, to such a temperature that it is quite plastic throughout so that it liquefies upon application of a mild degree of pressure. The temperatures required for attaining this result will vary with the composition or the molding composition and the amount of plasticizer present, this temperature being lower the greater the proportion of plasticizer. By way of example, the following proportions of cellulose acetate to plasticizers in molding compositions are given.

*Example I*

|  | Parts by weight |
|---|---|
| Cellulose acetate | 100 |
| Triphenyl phosphate | 12.5 |
| Dimethyl phthalate | 12.5 |
| Mixture or ortho- and para-ethyl toluene sulfonamid | 20.0 |

*Example II*

|  | Parts by weight |
|---|---|
| Cellulose acetate | 100 |
| Mixture of triphenyl phosphate and tricresyl phosphate | 15 |
| The phthalate of monomethyl ether of ethylene glycol (di-methoxyethyl phthalate) | 30 |

For these formulas which contain 45 parts of plasticizer per 100 parts of cellulose acetate, and which form products of normal hardness, the temperature of heating may be 160 to 170° C. (320 to 335° F.). For a softer formula containing say 50 parts of plasticizer per 100 parts of cellulose acetate, lower temperatures may be used, whereas for a hard formula, containing only 30 parts of plasticizer per 100 parts of cellulose acetate, higher temperatures will be required.

In order to obtain uniformity of physical properties in the molded articles, the molding composition containing the organic derivative of cellulose is preferably subjected to the action of heat only for such length of time necessary to impart the desired degree of plasticity or liquidity to the whole mass thereof, without subjecting the same to these elevated temperatures for such time as to cause decomposition or incipient decomposition in part or in all of the mass thereof. The time of heating will vary with the volume of the molding composition being heated, the size and shape of the heating chamber, the heating means and the formula of the molding composition. By way of example, it is pointed out that for the cellulose acetate molding powder specifically described above, the time of heating may be in the order of 1 to 5 minutes.

In order to avoid decomposition of the molding composition, the amount heated at one time in the heating chamber is preferably at most only slightly in excess, say 5 to 10%, of that required to fill the mold cavity, or multiple mold cavities into which it is extruded. Conveniently the heating chamber itself has a volume just sufficient to contain this amount of molding composition, and such heating chamber is preferably shaped in such a manner that the extruding piston or plunger can remove substantially all of the molding composition contained therein upon completion of its stroke. If an excess of molding composition is present in the heating chamber after the extrusion of the molding composition into the mold cavity, preferably the mold is removed and any material remaining in the heating chamber is purged by the extruding ram or plunger, in order to remove the excess material that has already been subjected to heat and which may deteriorate or decompose upon further heating in the next cycle.

This method of heating the organic derivative of cellulose molding composition produces molded products of uniform physical properties such as strength, since all of the material has been rendered plastic and no part of the same is overheated or decomposed, with the result that no part of the article is made of material which has been decomposed and which has not been thoroughly converted by the action of heat and pressure.

In the case of making molded products having mottled effects produced by the extrusion molding of chips of different colors, by my process, since the whole mass is plastic prior and during extrusion, sharp mottled effects are obtained, as the whole of the material flows, whereas in the prior processes, the material near the heated walls of the chamber was plastic while the interior was not, and this more highly heated material flowed more readily than the material of the interior, and good mottle effects were not produced.

In the prior processes involving the use of large heating chambers and large charges of molding materials that were heated prior to extrusion, the full benefit of the pressure applied by the extruding plunger or ram were not obtained. By minimizing the excess of molding material that is heated prior to extrusion by diminishing the size of the heating chamber, greater benefit is obtained from the effect of the pressure applied by the extruding ram or plunger, and because of this effective pressure, molded articles of greater strength are obtained.

I have found that the use of high pressures for extruding the heated molding composition into the die or mold cavity produces articles of superior properties. I have found that if pressures of 5000 to 50,000 or more pounds per square inch are applied by the extruding plunger or ram many advantageous results are obtained. While pressures of 5,000 to 20,000 pounds per square inch are generally sufficient in the case where the molding composition is heated as described above, pressures of 20,000 to 50,000 pounds per square inch are to be preferred when the prior practice of heating large quantities of molding composition in large heating chambers is employed. As to the choice of specific pressures, this will vary with the nature of the material and the quantity of molding composition to be extruded, the larger such quantity the greater the pressure required.

By the use of high pressures for extrusion, the high pressure is actually applied to the material while it is in the mold and the action of this pressure produces stronger products. On the other hand, by the use of smaller pressures in the prior practice, the material in the furthermost portion of the mold was not subjected to any appreciable pressure, since while it flowed into the mold there was no opposition to its flow and therefore no pressure was applied, and by the time the mold was filled, this material had cooled off and solidified so that no pressure was really applied thereto. By the use of the high pressures of this invention, the mold fills up very rapidly and the furthermost portion is still liquid and therefore subjected to the high pressures.

Moreover by heating the molding material in accordance with this invention and employing high pressures for extrusion "cold flow" of the material is avoided. In the prior practice, the molding composition when in the mold had an opportunity to cool below its plastic point and therefore was caused to flow completely into the mold while cold and not plastic. This cold flow greatly impaired the strength of the molded articles.

In order further to illustrate and explain my invention, but without being limited thereto, reference is had to the accompanying drawings which show diagrammatically apparatus that elucidates some modes of carrying out my invention, and wherein Fig. 1 shows a vertical cross-section of apparatus for the extrusion molding in an intermittent or batch process;

Fig. 2 is a plan view of apparatus for the extrusion molding in a continuous or automatic manner;

Fig. 3 is a cross-section along the line 3—3 of Fig. 2, and

Fig. 4 is a cross-section along the line 4—4 of Fig. 2.

Referring to Fig. 1, a hopper 1 is provided for containing and supplying the molding composition 2 to the extrusion molding apparatus. The hopper 1 feeds the molding composition by gravity to a heating cylinder or chamber 3, which is heated by means of the electric heating elements 4. A pressure plunger or ram 5 adapted to reciprocate in the cylinder 3 is provided and this is actuated by means of compressed air, gas or other fluid acting on the ends of the piston 6 contained in the cylinder 7. The fluid under pressure is conveyed to and exhausted from the cylinder 7 by means of the pipes 8 and 9, which lead to the control chamber 10, containing suitable valves that are operated by the lever 11.

The extrusion chamber 3 is formed with an extrusion nozzle 12, which preferably tapers off sharply from the cylindrical walls of the chamber 3, so that when the plunger 5 has completed its stroke, but little of the molding composition remains in the nozzle 12.

A mold or die 13 having a cavity 14 corresponding to the shape of the article to be molded is provided. This mold is preferably cooled by water or other cooling medium circulating therethrough. The mold 13 is made of two parts 15 and 16, the part 16 being provided with a passage 17 which registers with the passage in the nozzle 12. The ejector 18, whose end is normally restrained against entry into the mold cavity 14 by means of the spring 19, is provided, and upon movement of the portion 15 of the mold, the end 20 of the ejector engages the abutment 21 and moves laterally to eject the molded article in the molded cavity 14.

It is to be noted that the volume of the heating chamber 3 is only slightly in excess of that required to contain the amount of molding composition necessary completely to fill the mold cavity 14.

In operation of the device shown in Fig. 1, a molding composition having the formula either of the foregoing specific Examples I and II, is fed by the hopper 1 into the heating chamber 3, the plunger 5 having been previously forced to the right by the action of compressed air on the piston admitted through pipe 8. The molding composition is permitted to remain in the heating chamber 3 for about 1 to 5 minutes and in that time has attained a temperature of about 160 to 170° C. and is either flowable or will become flowable upon application of pressure. Thereupon, by manipulation of the lever 11 and the valves in the control chamber 10, compressed air or other fluid under high pressure is admitted into the chamber 7 through the pipe 9, the pressure of the air or fluid being such that the pressure of the end of the extrusion plunger 5 in the heating chamber 3 is from 5,000 to 20,000 pounds per square inch. Acting under this pressure, the plunger 5 forces the heating molding composition through the nozzle 12 into the mold cavity 14, whereupon it cools to form the molded article. The mold 13 is then opened, the part 15 thereof being moved laterally so that the member 20 engages the abutment 21 and the ejector 18 ejects the molded article.

Since the heating chamber 3 contains but little excess of material over that required to fill the mold cavity 14, substantially no molding composition remains in the chamber 3 after the extrusion. However if any molding composition does remain, the heating chamber 3 may be purged thereof by means of the piston 5 while the mold 13 is open.

After the extrusion step, the piston 5 is caused to move to the right, to permit the feeding of molding material to the chamber 3 and the cycle of operation is repeated.

Referring to Figs. 2 to 4, which show apparatus for carrying out the molding in an automatic or continuous manner, a rotatable table 25 actuated by means for intermittently rotating the same is provided. Upon this rotatable table 25 there are mounted a plurality of heating chambers or cylinders 26. Although six of such heating chambers 26 are shown, any suitable number, say 2 to 12 or more may be provided. These heating chambers 26 are heated by means of electric heating elements 27, to which electric current is applied by the contact rings 28, fed by the conductors 29.

At a predetermined point above the rotatable table 25, a stationary supply hopper 30 for supply of the molding material is provided, and this is adapted to supply a predetermined quantity of molding material to a heating chamber 26 immediately below it, by actuation of the sliding gates 31 and 32 in the throat 33 of the hopper. The quantity of material thus fed is preferably just about sufficient to fill the mold cavity.

At another predetermined point above the rotatable table 25, and preferably at a remote distance therefrom in direction of rotation of the table 25, there is mounted a stationary extruding plunger device, comprising a cylinder 35 in which the piston 36 reciprocates under the action of the pressure fluid admitted through the pipes 37 and 38 under control of the valves in the control box 39 and actuated by movement of the lever 40. An extrusion plunger 41 is actuated by the piston 36.

A plurality of molds 42 having cavities 43 are provided under the rotating table 25. While these molds 42 are shown on the drawings as being rotatably mounted, and a mold is provided for each heating cylinder 26, this is not essential, since even one stationary mold, provided it is in a position under the extrusion 41 may be sufficient.

Similarly as in the case of the mold 13 shown in Fig. 1, the mold 42 is adapted to be opened and the molded article ejected therefrom after extrusion of the molding material.

The rotatable table 25 is provided with any suitable means to impart intermittent rotation thereof. In Fig. 2, this means is shown as a Geneva movement which comprises a rotating disc 45 having a rotating projecting arm 46 attached thereto, to the underface of which a rod 47 is fixed, which rod is adapted to engage slots 48 in the table 25. The periphery of the table 25 has six cutaway portions 49, whose contours are arcs of the disc 45. The disc 45 is provided with a cutaway portion 50 to permit rotation of the table 25 during the period the rod 47 of the arm 46 engages a slot 48 in the table 25. In this manner, upon constant rotation of the disc 45 and arm 46, the table 25 is caused to rotate while the rod 47 of the rotating arm 46 engages a slot 48, but is locked against rotation during the remaining period by engagement of the uncut portion of the disc 45 with the periphery of the arcuated portion of the table 25.

In operation of the device shown in Figs. 2 to 4, a molding composition, say a cellulose acetate composition having the formula as described in specific Examples I and II, is charged into the hopper 30. The table 25 carrying the heating cylinders 26 is caused to rotate intermittently, and when a heating cylinder 26 comes into a position immediately under the discharge spout 33 of the hopper 30, the slide members 31 and 32 are caused to move by suitable automatic means so that the upper slide member 31 closes the spout 33 while the lower slide member 32 opens the spout and permits the predetermined amount of molding powder, which amount is not appreciably greater than that required to fill the mold cavity 43, to drop into the heated cylinder 26. The table then rotates to bring the next heating cylinder 26 under the supply hopper 30 and this cylinder is charged in a similar manner. The process of filling the heating cylinders 26 proceeds continuously.

A heating cylinder 26 having been charged with the molding composition, it is carried around by means of the rotating table 25 until it comes under the extrusion plunger 41 operated by the piston 36 in the cylinder 35. During this time it is heated to the point of plasticity or fluidity described above by means of the electric heating elements 27 which are supplied with electric current from the contact rings 28. The time required for the cylinder to travel from the supply hopper 30 to the extruding plunger 41 will be governed by the nature of the material and other considerations and will be such to obtain thorough and proper heating but to avoid overheating, the time being on the order of say 1 to 5 minutes.

When the cylinder 26 carrying the heated charge of molding composition comes under the plunger 41, the plunger is caused to enter the cylinder under the high pressure above specified, by the entry of air, gas or other fluid under high pressure through the pipe 37, the entry of such pressure medium being governed by the automatic manipulation of the valves in the control box 39. In this manner, the hot molding composition is forced into the mold cavity 43, and thereupon it is cooled and the solidified molded article is then ejected from the mold.

By this process, molded articles made of thermoplastic compositions containing organic materials, particularly organic derivatives of cellulose, may be made having all the desirable characteristics of properties set forth.

It is to be understood that the foregoing detailed description is given merely by way of illustration and many variations may be made without departing from the spirit of my invention.

Having described my invention, what I desire to secure by Letters Patent is:

Process for the injection molding of articles in a substantially continuous manner, which comprises moving a plurality of chambers around a circuit, charging each chamber with a thermoplastic material at one part of the circuit, heating the charge in each chamber over another part of the circuit, and at a further part of the circuit extruding each charge under pressure through a narrow passageway into a mold space.

ARTHUR E. PETERSEN.